United States Patent [19]

Trumbetas et al.

[11] 4,411,926
[45] Oct. 25, 1983

[54] STABILIZER FOR FROZEN FOAMED EMULSIONS AND METHOD THEREFORE

[75] Inventors: Jerome F. Trumbetas, Tarrytown; Rex Sims, Pleasantville; Joseph A. Fioriti, Hastings-on-Hudson, all of N.Y.

[73] Assignee: General Foods Corporation, White Plains, N.Y.

[21] Appl. No.: 345,873

[22] Filed: Feb. 4, 1982

[51] Int. Cl.$^3$ .................... A23D 5/00; A23G 9/02; A23J 1/14; A23J 1/20
[52] U.S. Cl. .................... 426/565; 426/566; 426/570; 426/654; 426/656; 426/580
[58] Field of Search ............... 426/654, 570, 565, 566, 426/567, 634, 598, 580, 570

[56] References Cited

U.S. PATENT DOCUMENTS

| | | | |
|---|---|---|---|
| 2,407,027 | 9/1946 | Mason | 426/570 |
| 3,268,335 | 8/1966 | Circle et al. | 426/634 |
| 3,268,503 | 8/1966 | Mustakas et al. | 426/634 |
| 3,287,139 | 11/1966 | Ganz | 426/558 |
| 3,343,967 | 9/1967 | Rubenstein | 426/654 |
| 3,350,209 | 10/1967 | Rodgers | 426/570 |
| 3,431,117 | 3/1969 | Lorant | 426/565 |
| 3,639,129 | 2/1972 | Mustakas et al. | 426/598 |
| 3,843,820 | 10/1974 | Glabe | 426/378 |
| 3,885,052 | 5/1975 | Starr | 426/250 |
| 4,325,979 | 4/1982 | Trop | 426/570 |

*Primary Examiner*—Jeanette M. Hunter
*Attorney, Agent, or Firm*—Thomas R. Savoie; Walter Scott; Daniel J. Donovan

[57] ABSTRACT

A process for making a protein stabilizer for an edible, frozen foamed emulsion in which proteins are modified by co-drying the protein with a selected emulsifier.

8 Claims, No Drawings

STABILIZER FOR FROZEN FOAMED EMULSIONS AND METHOD THEREFORE

FIELD OF INVENTION

This invention relates to edible foam-type emulsion products. More particularly, it relates to a process for making a frozen foam stabilizer which imparts whipped cream-type aeration and viscosity properties to products in which the stabilizer is incorporated.

DESCRIPTION OF THE PRIOR ART

The food industry has long sought to reduce the cost of producing stable, edible, frozen foams. However, fulfilling the competing demands of these properties has eluded a simple resolution. To be acceptable, the foamed product must both be light and form peaks when spooned. Technically, these criteria mean that the product must incorporate a large volume of air and be within a specified viscosity range. Furthermore, the edible nature of the product limits the choice of ingredients. Finally, the stability requirement further restricts solution's acceptability.

Lorant, in U.S. Pat. No. 3,431,117, disclosed an early solution to these problems. Lorant found that protein addition stabilized the whip of a fat, carbohydrate, and water mixture. While Lorant's prefered protein, sodium caseinate, was disclosed as permitting the formation of high quality foams, subsequent experience has shown that not all sodium caseinates yield this result. Consequently, sodium caseinates are classified as either of a high or low functionality, solely, on the basis of the stability of a frozen foamed emulsion which incorporates the caseinate. Due to the cost and limited sourcing of high functionality sodium caseinate, an alternative ingredient with a high functionality is greatly needed.

U.S. Pat. No. 3,268,335 issued to Circle et al. discloses a process where an aqueous dispersion of soy protein was combined with an aqueous dispersion of vegetable-origin, lipid emulsifiers. Specifically, Circle et al. used one of the following lipids: lecithin, hydroxylated lecithin, propylene glycol monostearate, or glyceryl lactostearate. The resulting protein-emulsifier dispersion was then spray dried. However, the product of the Circle et al. invention does not yield the highly functional protein materials necessary to manufacture stable, edible foams. The instant invention does produce these highly functional materials.

SUMMARY OF THE INVENTION

In this invention, stable, edible frozen foams are produced through a process, which among steps, modifies the protein-lipid interactions of the protein utilized. The protein to be modified is dispersed in water and by adjusting the pH the protein's conformation is altered to expose as many hydrophobic sites on the protein as possible. A sufficient quantity of a selected emulsifier is added to he protein dispersion so as to saturate the protein's available binding sites. The emulsifier forms a complex with the protein, which is then stabilized by drying (i.e. the co-dried complex remains associated upon rehydration). The rehydrated complex may be combined with lipids, emulsifiers, gum, carbohydrates, and water to produce a mixture which, upon being homogenized, chilled, and whipped, produces a foam that is stable, and acceptable as a food product after several freeze-thaw cycles.

DETAILED DESCRIPTION OF THE INVENTION

The process for making the protein-emulsifier complex which is the center of our invention begins with dispersing the protein source in water. one part protein source is mixed with between 1 and 100 parts of water, preferably between 10 and 100 parts of water. The pH of this protein dispersion is then adjusted with a food grade alkali to expose the protein's hydrophobic sites, typically in the pH range of 6.0 to 9.0. A pH range adjustment to 6.5 to 8.5 is prefered and 7.0 to 7.5 is more prefered. A quantity of one or more of the following emulsifiers: sodium succinoylated glycerol monostearate, sodium stearoyl lactylate, or polysorbate 60 sufficient to bind most of the protein's hydrophobic binding sites, is then added to the protein solution. This quantity of emulsifier is typically between 0.02 and 2 parts of the emulsifier, and preferably between 0.1 and 1 part emulsifier, per part of 100 percent protein material. The protein-emulsifier-water combination is mixed for between 15 seconds and 1 hour, with a longer or shorter time as necessary to allow the emulsifier to equilibrate with the protein's hydrophobic binding sites. The mixing time may be reduced if the dispersion is heated. This protein-emulsifier complex, once formed, is stabilized by drying. The addition of some sugar or other soluble solid to the solution before drying increases the dried complex's rate of hydration when formulating an edible foam. Any standard drying technique that does not subject the complex to undue heating, e.g. spray or freeze drying may be used to dry or co-dry the complex.

To prepare an edible foam, the dried protein emulsifier complex is rehydrated preferably as a 3 to 4 percent aqueous dispersion. Once the complex is fully rehydrated, flavors and sweetener, between 2 and 3 parts sweetener to every 5 parts of the protein-emulsifier complex dispersion are added to the protein-emulsifier complex dispersion. Separately, 20 to 30 parts of a hydrogenated vegetable oil are melted for every 0.5 to 2.5 parts of 100 percent protein-material used in the above dispersion. To this melt, a lipophylic emulsifier is added, the amount of the lipophylic emulsifier being between 25 and 67 percent of the emulsifier used in the protein-emulsifier complex. The melt is mixed until the emulsifier and oil are thoroughly dispersed, at which point two dispersions are blended together for three to five minutes and then homogenized in two stages, the first between 7000 and 9000 psig and the second between 450 and 1000 psig. After homogenization, the emulsion is cooled to about 4° C. and whipped for two to four minutes, in a mixer at high speed. The air incorporation and viscosity of the foam are then measured. The foam is then packaged and frozen at any temperature below −10° C.

Before freezing, the quality standards for these foams require a 200 percent overrun (OV): that is that at least two volumes of air are incorporated during the four minute whipping. Furthermore, the foam's viscosity (vis), as measured by a Brookfield Viscometer (1 7/16" T-bar, 5 rpm), must be between 28 and 50, but preferably between 34 and 42, so that the product's viscosity is similar to that of fresh whipped cream.

Additionally, the frozen foam's freeze-thaw (F/T) stability is determined by a qualitative evaluation considering: syneresis, less than 2 ml per pint of foam after thawing and refrigerating; air coalescence, exhibiting the texture of fresh whipped cream; and viscosity, so that the product peaks in a manner comparable to freshly whipped whipped cream. The product's F/T stability judged as acceptable (+) only if it meets all three of these criteria.

EXAMPLE 1

Soy protein isolate (78% protein), 200 grams, is slurried in two liters of water at 50° C. The protein-water combination is mixed until the protein is completely hydrated. Sodium hydroxide is then added to raise the pH to 7.1-7.3. Polysorbate 60, 45.6 grams, is added to the dispersion and mixing is continued for 30 minutes. Next, 200 grams of sucrose were added and the resulting dispersion is spray dried producing the co-dried protein-emulsifier complex.

The co-dried protein-emulsifier complex is rehydrated in water (42.7 grams of the protein-emulsifier complex including sucrose were rehydrated in 452.8 grams of water) so as to produce a 3.31% protein dispersion. To this dispersion, the following ingredients are added (in grams):

TABLE 1

| sucrose | 133.5 |
|---|---|
| corn syrup (80% solids) | 105.3 |
| dextrose | 6.5 |
| vanilla | 3.5 |
| vegetable gums (xanthan and guar) | 1.1 |

However, the gums, and dextrose are mixed well while dry before their addition to the aqueous dispersion.

Separately, 254.2 grams of hydrogenated coconut and palm oil are melted. To this melt, 1.4 grams of a lipophilic emulsifier, such as sorbitan monostearate, is added and the melt is mixed until the lipophilic emulsifier is thoroughly dissolved in the melted oil.

Once all the ingredients have been dispersed in each of the two separate fluid components aqueous and lipid, the two fluids are combined. The mixture is blended for 3-5 minutes in a Waring blender and then passed through Manton-Gaulin homogenizers, first at 8000 psig, and then at 500 psig. After homogenization, the emulsion is cooled to 4° C. and whipped for 2-4 minutes in a 5 quart Hobart mixer at maximum speed. The air incorporation and viscosity of the whipped emulsion are then measured. The foam is then transferred into pint-size containers and frozen at −10° F. for freeze-thaw stability studies.

EXAMPLE 2

Soy protein isolate, 19.2 grams, was dispersed in 452.8 grams of water. Once the soy protein isolate was hydrated the pH of the dispersion was adjusted to 7.1, 3.5 grams of polysorbate 60 were added, the dispersion was mixed, the ingredients in Table 1 were added to the protein dispersion along with an additional 20.0 grams sucrose to compensate for the sugar in the protein-emulsifier complex.

From the addition of the Table 1 ingredients on, Example 1 was followed.

EXAMPLE 3

Soy protein concentrate (61% protein) was used instead of soy protein isolate in Example 1 to produce the protein-emulsifier complex. To compensate for protein level differences, 55.1 grams of this complex were dispersed in the same volume of water and only 115.1 grams of sucrose were added.

EXAMPLE 4

Soy protein concentrate, 24.8 grams, was used instead of soy protein isolate in the procedure described in Example 2, with the additional sucrose being 11.3 grams.

EXAMPLE 5

Sodium caseinate (90% protein) imported from New Zealand generally has a high functionality. New Zealand sodium caseinate, 16.7 grams, was used instead of soy protein isolate in the procedure described in Example 2 with the additional quantity of sucrose being 22.5 grams.

EXAMPLE 6

A sodium caseinate (90% protein) with a low functionality, was used to produce the protein-emulsifier complex instead of soy protein isolate according to Example 1. To produce the 3.31% protein solution of this complex, 37.1 grams were dissolved in the 452.8 grams of water. Correspondingly, an additional 5.6 grams sucrose were added with the rest of the ingredients in Table 1 and the procedure of Example 1 followed therefrom.

EXAMPLE 7

A low functionality sodium caseinate was used instead of soy protein isolate according to the procedure outlined in Example 2. Again, adjusting for protein levels, 16.7 grams of sodium caseinate and an additional 22.5 grams of sucrose were added to the Example 2 formulation.

EXAMPLE 8

Using 52.3 grams of a protein-emulsifier complex formed according to the procedure in Example 1 by using peanut flour (64% protein) instead of soy protein isolate and reducing the amount of sucrose in Table 1 to 122.9 grams, Example 1 was followed.

EXAMPLE 9

Substituting 23.4 grams of peanut flour for the soy protein isolate in Example 2, Example 2 was followed with the exception that the additional sugar was 15.8 grams.

EXAMPLE 10

Pea protein isolate (96% protein) was used to produce the protein-emulsifier complex according to Example 1. This complex, 34.8 grams, was dissolved in water to which the ingredients of Table 1 with an additional 7.9 grams of sucrose. Otherwise, Example 1's procedure was followed.

EXAMPLE 11

Pea protein isolate, 15.6 grams, was dissolved in the water instead of the soy protein isolate and procedure of Example 2 was followed with the exception that the additional sucrose was 23.6 grams.

EXAMPLE 12

The protein-emulsifier complex in this example was produced from whey concentrate (70% protein). This complex, 47.8 grams was substituted into the procedure in Example 1 and only 127.4 grams of sucrose were added. Otherwise the procedures of Example 1 were followed.

EXAMPLE 13

The frozen foam in this example was produced from whey concentrate, 21.4 grams, according to the procedure in Example 2. However, the additional sucrose was only 14.9 grams.

Table 2 summarizes the amounts of: the protein-emulsifier complex, protein source, polysorbate 60, and sucrose used in Examples 1–13. These adjustments were made so that each example produced 1000 grams of product and contained 15 grams of protein based on the protein assay of the protein source employed.

TABLE 2

Amount of Varied Ingredients in Examples 1–13 (in grams)

| Example | Protein-Emulsifier Complex | Protein Source | Polysorbate 60 | Sucrose |
|---|---|---|---|---|
| 1. | 42.7 | — | — | 133.5 |
| 2. | — | 19.2 | 3.5 | 155.4 |
| 3. | 55.1 | — | — | 120.1 |
| 4. | — | 24.8 | 3.5 | 146.9 |
| 5. | — | 16.7 | 3.5 | 155.0 |
| 6. | 37.1 | — | — | 138.1 |
| 7. | — | 16.7 | 3.5 | 155.0 |
| 8. | 52.3 | — | — | 122.9 |
| 9. | — | 23.4 | 3.5 | 148.3 |
| 10. | 34.8 | — | — | 140.4 |
| 11. | — | 15.6 | 3.5 | 156.1 |
| 12. | 47.8 | — | — | 127.4 |
| 13. | — | 21.4 | 3.5 | 150.3 |

Table 3 presents the results of making edible frozen foams from various modified and unmodified protein sources. As will be seen from Examples 1, 3, 6, 8, 10 and 12, all protein sources became more highly functional when modified in accordance with the instant invention. In contrast, the respective controls, Examples 2, 4, 7, 8, 11 and 13, demonstrate that the mere blending of the ingredients, without co-drying, does not increase functionality.

TABLE 3

Improvement In Protein Source Functionality with Modification of Protein

| Example | Co-dried (Y or N) | Protein Source | OV | Vis | F/T Stability (days) 0 | 2 | 6 | 10 |
|---|---|---|---|---|---|---|---|---|
| 1. | Y | Soy isolate | 229 | 37 | + | + | + | + |
| 2. | N | Soy isolate | 200 | 32 | — | — | — | — |
| 3. | Y | Soy concentrate | 229 | 40 | + | + | + | + |
| 4. | N | Soy concentrate | 175 | 26–45 | — | — | — | — |
| 5. | N | N.Z. sodium caseinate | 240 | 38 | + | + | + | + |
| 6. | Y | Sodium caseinate | 246 | 43 | + | + | + | + |
| 7. | N | Sodium caseinate | 207 | 38 | — | — | — | — |
| 8. | Y | Peanut flour | 198 | 55 | + | + | — | — |
| 9. | N | Peanut flour | 180 | 21 | — | — | — | — |
| 10. | Y | Pea isolate | 220 | 53 | + | — | — | — |
| 11. | N | Pea isolate | 191 | 19 | — | — | — | — |
| 12. | Y | Whey concentrate | 202 | 38 | + | + | — | — |
| 13. | N | Whey concentrate | 190 | 15 | — | — | — | — |

EXAMPLES 14–18

Modifying Example 1, 91.2 grams of emulsifier are added to the protein dispersion. After this preparation has been co-dried, 46.1 grams of the co-dried complex are used in making the frozen foam. In these examples, sodium stearoyl lactylate, sodium succinoylated glycerol monostearate, propylene glycol monostearate, glycerol lactostearate, and hydroxylated lecithin are used successively as the emulsifier.

In Table 4, the results of Examples 1, 14 and 15 show that co-drying a protein with either polysorbate 60, sodium stearoyl lactate, or sodium succinoylated glycerol monostearate produces a high functionality frozen foam stabilizer. The results of Examples 16, 17 and 18 show that co-drying a protein with various other emulsifiers which are not within the scope of this invention does not produce a high-functionality frozen foam stabilizer.

TABLE 4

Effect of Emulsifier Identity Upon Functionality Improvement of Soy Isolate

| Example | Emulsifier | OV | Vis | F/T Stability (days) 0 | 2 | 6 | 10 |
|---|---|---|---|---|---|---|---|
| 1. | Polysorbate 60 | 229 | 37 | + | + | + | + |
| 2. | Polysorbate 60, not co-dried | 175 | 45 | — | — | — | — |
| 14. | Sodium stearoyl lactylate | 244 | 45 | + | + | — | — |
| 15. | Sodium succinoylated glycerol monostearate | 235 | 28 | + | + | — | — |
| 16. | Propylene glycol monostearate | 170 | 43 | — | — | — | — |
| 17. | Glycerol lactostearate | 167 | 50 | — | — | — | — |
| 18. | Hydroxylated lecithin | 184 | 33 | + | — | — | — |

It is also within the scope of this invention to use the modified proteins in combination with each other or with unmodified, highly functional sodium caseinate.

What is claimed:

1. An edible, frozen emulsion foam stabilizer comprising a co-dried, pH adjusted, protein-emulsifier complex having a pH between about 6.0 to about 9.0, wherein the protein is soy isolate, soy concentrate, sodium caseinate, or combinations thereof and the emulsifier is polysorbate 60, sodium stearoyl lactylate, sodium succinoylated glycerol monostearate, or a combination thereof and the ratio of emulsifier to protein is between 0.02 and 2 parts emulsifier per part protein.

2. A frozen dessert topping comprised of the foam stabilizer in claim 1, hydrogenated vegetable oil, sweetener, flavors, emulsifier, gum and water.

3. A process for making an edible frozen foam stabilizer comprising the steps of:
   dipersing a protein in water;
   adjusting the pH of the dispersion to between about 6.0 and about 9.0;
   adding an emulsifier to the dispersion, wherein the emulsifier is polysorbate 60, sodium stearoyl lactylate, sodium succinoylated glycerol monostearated, or a combination thereof, and the emulsifier protein ratio is between 0.02 and 2 parts of the emulsifier per part protein;
   mixing the dispersion thoroughly; and
   thereafter drying.

4. A process according to claim 3 where the protein is a low functionality sodium caseinate.

5. A process according to claim 3 where the protein is of vegetable origin.

6. A process according to claim 3 where the protein is either soy isolate or soy concentrate.

7. A process according to claim 3 where the dispersion is dried by spray drying.

8. A process according to claim 3 where the dispersion is dried by freeze-drying.

* * * * *